Nov. 3, 1964　　G. HOLZMAN ET AL　　3,155,742
ALKYLATION PROCESS
Filed Sept. 11, 1961
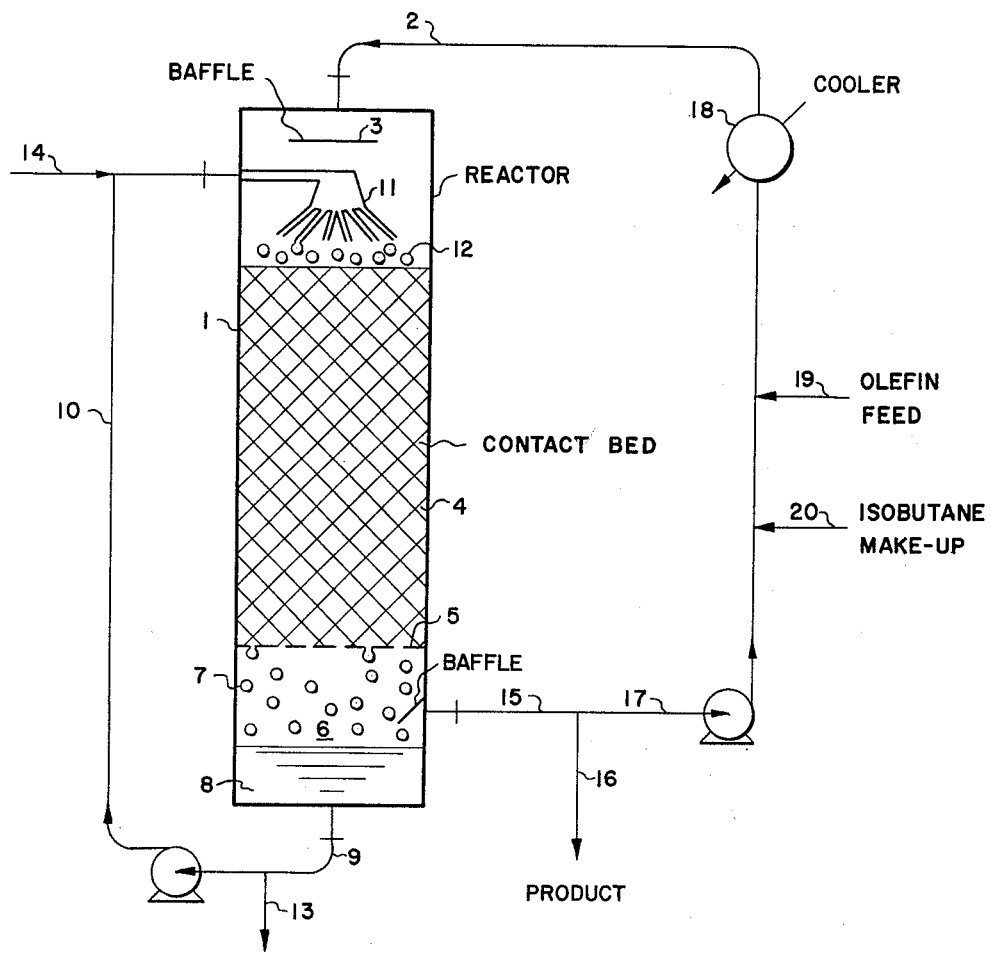
INVENTORS:
GEORGE HOLZMAN
RICHARD P. TRAINER
BY: Robert C. Clement
THEIR ATTORNEY

3,155,742
ALKYLATION PROCESS

George Holzman and Richard P. Trainer, Walnut Creek, Calif., assignors to Shell Oil Company, New York, N.Y., a corporation of Delaware
Filed Sept. 11, 1961, Ser. No. 137,334
9 Claims. (Cl. 260—683.48)

This invention relates to an improved process for the preparation of high octane components by alkylating isoparaffins with olefins in the presence of an acid catalyst.

Alkylation of isoparaffins with olefins, e.g., isobutane with butenes, in the presence of an acid catalyst is well known. Since the installation in the late 1930's of the first commercial process employing sulfuric acid as the catalyst, the alkylation process has grown rapidly in use and importance. Alkylation capacity in the United States alone is reported to be in excess of 400,000 barrels per stream a day with additional capacity under construction or planned. Sulfuric acid and hydrofluoric acid are the principal acids used in the commercial process, sulfuric acid being the catalyst predominantly used. Therefore, this invention will be described with regard to sulfuric acid but should not be limited to it.

Commercial sulfuric acid and hydrofluoric acid alkylation processes are described for example in "Petroleum Refiner" 530, No. 9, 152–159 (September 1951), "Petroleum Processing," 12, No. 4, 107–109 (April 1957), "Oil and Gas Journal," 59, No. 14, 157–160 (April 3, 1961). In brief, isobutane and olefin feeds are injected into a reaction zone where the alkylation reaction takes place in the presence of sulfuric acid catalysts. The acid and hydrocarbon are intimately mixed by highly vigorous agitation to form an emulsion with acid as the continuous phase. This emulsion is circulated and cooled to remove heat liberated in the alkylation reaction. The emulsion is often passed through a suitable vessel to provide sufficient reaction time, the vessel generally being equipped with baffles, multiple orifices, packing, or other suitable internals to maintain the mixture as an emulsion. A portion of the circulating emulsion is removed to a settling zone for separation of the hydrocarbon product and acid, which is returned to the reactor.

For satisfactory emulsions, with normal power input for mixing, a mix comprising at least about 42% to 50% acid and 58% to 50% hydrocarbons, on a volume basis, is usually required. With emulsions containing less than 40 to 50% acid, the yield and quality of alkylate drops rapidly. This break point varies from plant to plant and is affected by acid strength, whether the acid is fresh or reconcentrated, feed analysis, type of mixer, mixing horse power, and the like. Thus, when an $H_2SO_4$ hydrocarbon emulsion containing below about 40 to 50% acid is used, the emulsion withdrawn from the reactor generally contains less acid than that in the reactor possibly due to settling or emulsion resolution within the reaction zone.

The hydrocarbon and acid are violently agitated with such means as pumps, impeller mixers and the like, to provide a proper emulsion of minute droplets of hydrocarbon highly dispersed in the acid. It is generally considered that best results are obtained with "tight" emulsions, e.g., those which are sufficiently emulsified so that separation of acid and hydrocarbon does not occur readily. The tight emulsions generally result from high input of mixing energy and a high acid content in the emulsion, i.e., about 60–65% by volume and higher. Horse power requirements for mixing are generally of the order of 100–150 horse power per 1000 barrels of alkylate per day. However, to provide even better emulsions, the recent trend has been to provide more mixing in new alkylation units, the installed mixing horsepower being on the order of 200 horsepower per 1000 barrels of alkylate per day.

Tight emulsions produced by higher acid contents and high degree mixing however do present disadvantages in that they reduce heat transfer efficiency in emulsion coolers, and require longer settling times in the product recovery system where the hydrocarbon product is recovered from the acid. Moreover, operating costs are increased in supplying the higher mixing horsepower requirements.

It is an object of this invention to provide an improved process for alkylating isoparaffins with olefins. It is a further object of this invention to alkylate isoparaffins with olefins to a high yield of alkylate product with low energy requirements and with a minimum of capital outlay. These and other objects will become more apparent from the following description.

It has now been discovered that it is possible to utilize a relatively small amount of acid alkylation catalyst in a bed of solid inert material having a hydrophilic surface and to alkylate isoparaffins with olefins to a high yield of alkylate product. According to the invention, the hydrocarbon reactants are passed over the hydrophilic surface of the contact bed which is preferentially wetted by the strong mineral acid alkylation catalyst. The contact bed serves not as a means of dispersing the acid and hydrocarbon, but as a means of retaining the alkylation acid on its surface in the form of a relatively thin film, thus providing a large contact surface for the hydrocarbon reactants. Preferably from about 0.01 to about 0.3 part by volume of acid per part by volume of hydrocarbon feed are passed through the contact bed with the reactants. Both the hydrocarbon and the acid leave the contact bed as separate liquid phases and are readily separated.

The contact bed should consist of inert material, i.e., the material should not react with the liquids to be passed therethrough. The surface of the contact bed should be hydrophilic so that it is preferentially wetted by the acid catalyst. The alkylation acid is thereby retained on the surface of the contact bed and in this way, a large contact surface is formed. Examples of contact material suitable for use in carrying out the process according to the invention are ceramic materials, lava, glass, gravel, ion exchange resins such as one of the sulfonated

TABLE I
Supports for Alkylation Acid

| Support | Glass Beads | River Gravel | Lava Rock | Norton Alumdum 8A-101 | Filtros FS-140-L | Filtros FS-140-L7 | Coke Breeze |
|---|---|---|---|---|---|---|---|
| Particle Size | 3 mm. spheres | 4-6 mesh | 4-8 mesh | ⅛″ pellets | 4-8 mesh | 4-8 mesh | 4-8 mesh. |
| Bulk Density, g./cc | 1.65 | 1.53 | 0.78 | 1.3 | 0.87 | 0.93 | .51. |
| Void Volume, Percent [a] | 40 | 33 | 48 | 38 | 46 | 63 | 41. |
| $H_2SO_4$ Retention, Percent v.[a] | 4 | 7.6 | 14-16 | 19 | 18 | 10 | 18. |
| Total Void+Pores, Percent v.[a] | 40 | 43 | 64 | 57 | 64 | 75 | 59. |
| Ratio, Void Volume/Acid Retention Vol. | 10 | 4.6 | 3-3.4 | 2 | 2.6 | 6.3 | 2.3. |

[a] Based on total packed volume of bed.

polystyrene type "coke-breeze" and the like. The contact material may have the form of Raschig rings, Berl saddles, Dixon packing, beads or fibers. The particle size of the contact material can vary from 0.1 mm. to 30 mm. Various support materials and their pertinent properties are given in Table I.

It is desirable for the contact surface of the liquids to be as large as possible. The use of a contact bed consisting of particles having an average size of from 0.1 mm. to 0.5 mm. assures that the contact surface per unit of volume of the contact material is very large. If the particles on the contact bed are larger than 10 mm., the contact surface of the liquids is relatively small. Contact material having an average particle size of 0.5 to 10 mm. is preferably used. The contact bed can consist of particles of about equal size although it may also consist of layers, each of which is formed by particles of about the same size but in which the particles are different in size from layer to layer.

It is important to avoid the formation of an emulsion in the contact bed especially at the discharge side of the bed. Hence, when acid is charged to the contact bed with the hydrocarbon feed, the quantities in which the two liquids are supplied to the contact bed per unit of time and the direction of flow of the two liquids through the contact bed are preferably such that both liquids leave the contact bed as continuous phases.

In the process according to the present invention, it is required that the two liquids leave the contact bed as continuous phases. For this purpose, it is essential that the two liquids flow through the contact bed as substantially continuous phases and this is realized by flowing the alkylation acid in the form of a coherent layer (film) over the surface of the contact particles with the hydrocarbon reactants being passed through the interstices between the particles covered with treating liquid. For this reason the process of the invention is referred to as laminar flow alkylation to distinguish it from the conventional process wherein the liquids are violently agitated and are in turbulent flow.

As a consequence, of the two liquids being present as two continuous phases in the contact bed, they are still present as continuous phases at the moment that they leave the contact bed. It is only at that time that droplets may form (usually of the alkylation acid in the hydrocarbon) and substantially all droplets thus formed from the continuous phases present at the exit of the contact bed have such large diameters that their velocity fall is distinctly higher than the velocity of the liquid mixture immediately after leaving the contact bed. This difference in velocities allows a very rapid and substantially complete separation of the two liquids under the mere influence of gravitational forces, without the use of expensive separator devices, resulting in a liquid hydrocarbon that on visual inspection is entirely clear and free from haze and turbidity. The flow of two immiscible liquids through a bed of hydrophilic contact material is described in copending application Serial No. 825,778, filed July 8, 1959, now U.S. Patent No. 3,014,861, in the name of Weigert C. Buningh.

The alkylation acid and hydrocarbon flow concurrently and downwardly through the contact bed. Where the two liquids are passed upwardly through the contact bed, the alkylation acid, which has a higher specific gravity than the hydrocarbon, tends to accumulate in the lower part of the contact bed. Accumulation of acid in the lower part of the contact bed can result in a pool of acid through which the hydrocarbon would flow upwardly as globules, and thus would tend to reduce contact efficiency and therefore produce a low yield of alkylate.

The surface of the contact material can be wholly or partly wetted by the alkylation acid. If part of the surface were wetted with the alkylation acid, the contact surface of the liquids would be smaller than if the entire surface of the contact bed were wetted by the acid. It is therefore clear that it is advisable to wet the entire surface of the contact bed with the acid and to keep it wetted. A convenient expedient comprises wetting the contact bed in advance with the alkylation acid and recycling excess acid during operation, spreading the recycle acid as uniformly as possible over the entire surface of the contact material during operation. In order to wet part of the contact bed or the entire part of the contact bed and keep it wetted, the quantity of alkylation acid supplied to the contact bed per unit of time should not fall below a minimum. This minimum depends on various factors, such as the nature of the contact of bed material, viscosity of the sulfuric acid, liquid velocity through the bed, and the like. In general, the amount of acid supplied to the contact bed should be no lower than about 0.01 and preferably 0.05 part by volume of acid per part by volume of hydrocarbon feed.

The surface of the contact material can be smooth, rough or somewhat porous. If porous, the pores should be relatively large, i.e., macro pores, so as to facilitate passage of liquid into and out of the pores. Although the amount of alkylation acid holdup within the contact bed is increased through the use of certain porous materials, it has generally been found that somewhat poorer results are obtained even with macroporous materials. Presumably, the acid which fills the pores is not readily accessible to the hydrocarbon reactants. Moreover, even when the acid is reached by the hydrocarbon, too long a contact time is likely so as to promote unfavorable side reactions. Thus, it is preferred that the contact surface should be smooth or somewhat rough, rather than porous.

In the process of the invention, isobutene generally produces alkylate of a quality comparable to if not better than that obtained with n-butene, such as 2-butene. This is in marked contrast to results obtained in a conventional alkylation process, even with a well stirred reactor, wherein 2-butene usually gives much higher quality alkylate. Alkylation of easily polymerized olefins such as isobutene occurs close to the acid interface while alkylation of less easily polymerized olefins such as n-butene or propylene occurs to a greater extent in the bulk acid phase. Thus, in a conventional alkylation process, the mass transfer into the acid phase of isobutane, which is less soluble in acid than the olefins, is a critical factor controlling alkylation. Thus, in a stirred reactor, isobutane mass transfer is governed by the ability to disperse droplets of hydrocarbon throughout the acid.

In the present process, the acid is present as a thin film on the surface of the support material therefore mass transfer of isobutane into the acid phase is less of a factor. As mentioned hereinbefore, support materials having a large amount of relatively inaccessible pores generally lead to less favorable results since the diffusion of isobutane into the pocket of acid within such pores is slow. The accessibility of the pores of the support material has an important bearing on the final results since relatively good results are obtained in the process of the invention with the highly porous (75% vol.) cemented silica aggregate (Filtros) since the void space in this support consists of large channels and pores which are accessible to the hydrocarbon reactants.

The hydrocarbon reactants in the alkylation process are isoparaffins and olefins. The predominant sources of isoparaffins for the alkylation are isobutane and possibly isopentane which are recovered from the distillation of crude petroleum; further amounts of isobutane and/or isopentane can be produced by the catalytic isomerization of the corresponding saturated normal paraffins.

The predominant source of olefins are the light fractions recovered from thermally and catalytically cracked petroleum fractions. These fractions include a $C_3$ cracked fraction, a $C_4$ cracked fraction, a $C_5$ cracked fraction and even a $C_6$ cracked fraction or mixtures thereof. Particularly suitable fractions are the $C_4$ cracked fraction, with the $C_3$ and $C_5$ cracked fractions also especially preferred.

It is of importance in alkylation processes that the hydrocarbon mixture in the alkylation zone contain a substantial excess of the isoparaffins. Thus, the external isoparaffin olefin ratio is usually maintained between 3.5:1 and 8:1 in sulfuric acid alkylation, and even higher, e.g., between 6:1 and 12:1, in HF alkylation. The internal isoparaffin olefin ratio is preferably at least 300:1 and may be as high as 800:1 or more. Since the isoparaffin is present in the alkylation zone in excess of that required for the reaction, a substantial amount remains unconverted while practically all of the olefin is combined with isoparaffin. Since other hydrocarbons such as normal paraffin, and even the alkylate product itself, act as a diluent for the isobutane and olefin reactants, perhaps a better indication of proper alkylation conditions is the percent of isobutane in the reactant effluent. Thus, it is generally desired to operate with an isobutane content in the reactor hydrocarbon effluent of about 50% and higher. However, operation can be effected at lower isobutane contents if accompanied by low olefin feed rates, as may be seen from the tables in the examples.

The alkylation catalyst is a strong mineral acid such as sulfuric acid or anhydrous hydrofluoric acid. The titratable acidity of the sulfuric acid employed as catalyst in the alkylation reactor is generally in the range from 85% to 100% $H_2SO_4$ and preferably between 88% and 98% $H_2SO_4$. It is general practice to charge to the process sulfuric acid having between 96% and 100% concentration and to use it until its titratable acidity has dropped to a lower value, e.g., about 85 to 90%. The concentration of hydrofluoric acid used as an alkylation catalyst is between 80% and 100%, and suitably between 86% and 90%, care being taken to keep water out of the reaction system.

The alkylation reaction is carried out at temperatures in the range of from 0° C. to about 22° C. and preferably from 4° C. to 16° C. and pressures in the range from atmospheric to 135 p.s.i.g., but sufficiently high to maintain the reactants in liquid phase. Alkylation with anhydrous HF catalyst can be carried out at somewhat higher temperatures than the sulfuric acid catalyst and is generally between 0° C. and 65° C., preferably between 25° C. and 45° C.

It is essential to the practice of the invention that a small amount of acid relative to the amount of hydrocarbon be maintained within the reaction zone. Within the reaction zone then, the total amount of acid relative to the amount of hydrocarbon should be from about 0.05:1 to about 0.4:1 and preferably from about 0.1:1 to 0.25:1 on a volume basis.

The total amount of acid within the reaction zone includes the amount of acid holdup by the contact material as well as any recycle acid passing through the bed. It is preferred to pass recycle acid through the bed with the hydrocarbon to assure that sufficient acid is present to wet the entire bed of contact material. Moreover, the recycle acid, in flowing across the surface of the contact material as a thin film, serves to renew the acid on the contact material. Even though recycle acid tends to increase the thickness of the acid film on the support, no adverse effect on yield or selectivity is observed. Thus, the amount of recycle acid can vary considerably as long as the total amount of acid in the reaction zone is within the prescribed limits. For example, with glass beads where the amount of acid holdup is relatively small, i.e., 2.5–5% v., the amount of excess acid which is recycled through the bed can be as high as two to three times the amount of acid holdup on the beads. Usually the amount of recycle acid is less than about 25%, preferably less than about 20%, of the residual interstitial volume of the contact material after the contact material is wetted with a film of acid. The residual volume is often inconvenient to determine, therefore, it is preferred that the amount of excess acid recycled to the contact bed be from about 0.01 to 0.3 part per volume, and preferably from about 0.05 to 0.2 part per volume, per part by volume of hydrocarbon feed.

The contact bed is contained in a suitable vessel such as a sphere, cylindrical tower, or the like. The contact material is suitably supported within the vessel by means such as perforated plates, screens, grids, and the like. It is generally preferred to provide a space above and below the contact bed to provide room for liquid distributor heads, separation and collecting zones, and the like.

The process according to the invention will now be described with reference to the accompanying schematic drawing which illustrates an apparatus and method for carrying out the present process. Hydrocarbon is introduced in the reaction vessel 1 through line 2, which discharges into the upper part of the reaction vessel. Below the discharge opening a suitable baffle is provided, such as circular plate 3. The liquid hydrocarbon flows downwardly through the reaction vessel, passing through the particulate contact bed 4 which is wetted with alkylation acid and which is supported on grid 5, and into settling zone 6, which is the space beneath the contact bed. The alkylation acid, draining by gravity from the bed and being stripped from the contact material by the moving hydrocarbon, leaves the contact bed as liquid droplets 7 which are rather large in diameter and, being of greater density than the hydrocarbon liquid, readily fall to the bottom of settling zone 6 where the droplets are accumulated as a pool of acid 8. The acid is withdrawn from the reaction vessel through line 9 and is returned to a point above the contact bed by means of line 10 which terminates in distributing head 11 suitably having a number of openings to distribute the emerging alkylate acid as liquid droplets 12 uniformly over the upper surface of the contact bed. Spent acid is withdrawn through line 13 as required and fresh make up acid is introduced through line 14. Liquid hydrocarbon completely or substantially free of acid is withdrawn from the reaction vessel through line 15.

The alkylation reaction is an exothermic one, therefore, it is generally desirable to recycle a large proportion of the liquid hydrocarbon back through the reaction zone after suitable cooling to remove the heat of reaction. By absorbing the heat of reaction in a large volume of recycle hydrocarbons, the temperature rise within the reaction zone is maintained within the desirable limits. Moreover, recycling large volumes of hydrocarbon through the reaction zone provides additional overall contact time which permits any olefins which were not reacted during the initial pass through the reaction zone to be alkylated in the subsequent passes. Consequently, a major proportion of the hydrocarbon from line 15 is returned to the reactor via line 17, cooler 18, and line 2. It is to be understood that cooler 18, cooled with a suitable refrigerant such as ammonia, can also be of the evaporative type wherein a portion of the liquid hydrocarbon is vaporized, the remaining liquid being cooled by the evaporating hydrocarbon. The olefin feed and the isobutane recycle and/or makeup isobutane can be introduced into the hydrocarbon recycle line before or after the pump, but preferably upstream of the cooler so as to be cooled along with the recycle hydrocarbons. If desired, the isobutane and olefin streams can be admitted directly to the top of the reaction vessel and this is the preferred manner when cooling zone 18 is of the evaporative cooling type. Hydrocarbon product is withdrawn through line 16 and worked up in a conventional manner.

As mentioned hereinbefore, contact time for the alkylation reaction can be provided by recycling a part of the hydrocarbon over the contact bed. Contact time can also be increased by lowering the velocity of the hydrocarbons through the contact bed by increasing the amounts of acid per unit of space (which can be done for example by comprising a contact material of smaller particle size)

or by increasing the depth of the contact bed. Contact times of about five to thirty-five minutes are preferred but can be varied depending upon the type of apparatus, contact bed, nature of olefin feed and the like, from about a minute to as much as 60 minutes.

The amount of hydrocarbon recycle can vary over a wide range as to achieve the desired contact time. Recycle is conveniently expressed as the volume of recycle hydrocarbon per volume of olefin feed and preferably is in the range from 10 to about 1500 although the recycle can vary as low as one and as high as 60,000. Too high a recycle rate is not only undesirable from the standpoint of equipment and operating costs but can lead to excessive velocities through the contact bed. Hydrocarbon velocity through the contact bed is generally limited to no more than about one foot per second. Although velocities somewhat above this limit can be used, in general it may tend to create excessive pressure drop through the bed, cause excessive stripping of the acid catalyst from the inert solid and can lead to the formation of undesirable emulsions.

EXAMPLE I

The alkylation of isobutane with various light olefins was conducted in a jacketed reaction vessel containing a contact material such as one of those listed in Table I. A cooling medium was circulated through the jacket to maintain the reaction zone at the desired temperature.

Concentrated sulfuric acid (100% $H_2SO_4$) was first applied to the contact bed in the reactor and then a mixture of n-pentane and isobutane was circulated down through the contact bed until the temperature in the reaction zone leveled out at the desired operating temperature. At this time the olefin was injected into the circulating hydrocarbon stream ahead of the reaction zone. When acid recycle was desired, excess acid percolating through the bed was recovered from the hydrocarbon after leaving the reaction zone and was recycled to the top of the reaction zone.

Reaction conditions and product distribution data for the alkylation of isobutane and isobutene over 4–6 mesh river gravel are given in Table II.

TABLE II

*Alkylation of Isobutane and Isobutene*

| | |
|---|---|
| (A) Vol. olefin/vol. acid/hr | 0.036 |
| (B) Percent v. i-$C_4H_{10}$ in hydrocarbon (n-pentane diluent) | 28 |
| Process factor $(B)/(A)^{0.5}$ | 147 |
| Temperature, °C | 10–11 |
| Acid on carrier, percent v. | 7.3 |
| Average acid/hydrocarbon vol. ratio (percent v. acid) | 0.23 (19) |
| Hydrocarbon circulation, vol. total hydrocarbon feed/vol. olefin feed | 50,000 |

Product distribution, percent w.:

| | |
|---|---|
| $C_5$ | 11.8 |
| $C_6$ | 6.7 |
| $C_7$ | 6.6 |
| $C_8$ 2,2,4-TMP | 26.0 |
| 2,5-, 2,4-DMH + 2,2,3-TMP | 8.8 } 60.6 |
| 2,3,4-, 2,3,3-TMP + 2,3-, 3,4-DMH | 25.8 |
| $C_9$ 2,2,5-TMH | 6.0 |
| Other | 1.9 |
| $C_{10}$ | 2.2 |
| $C_{11}$ | 1.0 |
| $C_{12}$ | 2.9 |
| $C_{13}$+ | 0.2 |
| | 100.0 |
| Light alkylate ($C_5$–$C_{11}$), percent w. of $C_5$+ alkylate | 96.5 |
| Calc. S-4 PN of $C_6$–$C_{11}$ alkylate | 154 |

The high selectivity and yield for the alkylation process of the invention can be seen from the product distribution data in the above table. The high proportion of octanes and the relatively small proportion of other hydrocarbons, particularly the high carbon number hydrocarbons, indicates the favorable extent of primary alkylate production compared to less desirable reactions such as olefin polymerization.

Similar results were obtained in experiments with 2-butene as feed, although glass beads as the support material seemed to give slightly better selectivities than with river gravel even though acid holdup was less, e.g., 2.5–5% v. compared to about 7.3 v., respectively. A cemented silica aggregate support gave results similar to that for the glass beads. The use of lava as an acid support resulted in alkylate of lower quality than that obtained with glass beads. There seemed to be little significant difference in octanes selectivity from the recycle of excess acid whether the support used was non-porous such as glass beads or porous such as lava.

EXAMPLE II

To illustrate the advantage obtained by the process of the invention, results obtained in the manner and apparatus as described in Example I are compared to those obtained with a vertical mixer (Stratco) manufactured by Stratford Engineering Company and which is widely used in commercial alkylation processes. Although the olefin space velocity (A) for the laminar flow operation was lower than that employed in the Stratco mixer, the isobutane content (B) is also lower so that the comparison is made at about the same process factor $(B/A^{0.5})$. This process factor has been determined previously to be a rather effective correlating parameter for alkylation of isoparaffins and olefins. The comparative results are given in Table III.

TABLE III

*Comparison of Alkylation Processes*

| | Laminar Flow Alkylation | Commercial Vertical Stratco |
|---|---|---|
| Feed | Isobutylene | Mixed Isobutylene-n-Butene [a] |
| (A) Vol. olefin/vol. acid/hr | 0.11 | 0.705 |
| (B) percent v. i-$C_4H_{10}$ in hydrocarbon | 24 (n-pentane diluent) | 65.0 |
| Process factor $(B)/(A)^{0.5}$ | 72 | 77 |
| Temperature, °C | 10.5 | 6.7 |
| Average acid/hydrocarbon vol. ratio (percent v. acid) | 0.23 (19) | 0.20 (16.9) |
| Hydrocarbon circulation, vol. total hydrocarbon feed/vol. olefin feed | 16,500 | Contactor speed 3,600 r.p.m. |
| Catalyst Support | 4/6 mesh river gravel | |
| Catalyst | 100% w. $H_2SO_4$ initial, percent w. $C_5$+ | 86.4% w. $H_2SO_4$, 2.3% w. $H_2O$, percent w. $C_5$+ |
| Product Distribution: | | |
| $C_5$ | 14.1 | |
| $C_6$ | 9.1 | 7.0 |
| $C_7$ | 7.5 | 7.8 |
| $C_8$ 2,2,4-TMP | 18.1 | 10.0 |
| DMH | 8.4 } 43.6 | 5.8 } 30.2 |
| 2,3,4-, 2,3,3-TMP | 17.1 | 14.4 |
| $C_9$ 2,2,5-TMH | 8.5 | 8.6 |
| Other $C_9$ | 2.4 | 4.2 |
| $C_{10}$ | 3.7 | 6.2 |
| $C_{11}$ | 3.0 | 5.9 |
| $C_{12}$ | 4.9 | 15.4 |
| $C_{13}$+ | 3.2 | 14.8 |
| | 100.0 | 100.1 |
| Light alkylate ($C_5$–$C_{11}$), percent w. of $C_5$+alkylate | 90.6 | 69.8 |
| Calc. S-4 PN of $C_6$–$C_{11}$ alkylate | 146 | 144 |

[a] Feed contains Ca. 45% isobutylene, 46% n-butenes, 6% propylene, and 3% amylenes.

As may be seen from the product distribution given in the above table, the yield and selectivity from the laminar flow alkylation are markedly superior to the operation with conventional mixers. The large differences in yield and selectivity are much more than any slight differences which could be attributed to variation in acid strength and/or feed composition.

EXAMPLE III

Laminar flow alkylation of isobutane and 2-butene was carried out with glass beads as the support material for the sulfuric acid catalyst. The alkylation was conducted in a manner similar to that described in Example I but with acid recycle through the bed. The results shown in Table IV again illustrate the high yield and selectivity obtained by laminar flow alkylation.

TABLE IV

*Laminar Flow Alkylation—Acid Recycle*

| | |
|---|---|
| Feed | 2-butene. |
| (A) Vol. olefin/vol. acid/hr | 0.055. |
| (B) Percent v. i-$C_4H_{10}$ in hydrocarbon (n-pentane diluent) | 29. |
| Process factor $(B)/(A)^{0.5}$ | 120. |
| Temperature, °C | 11. |
| Average acid/hydrocarbon vol. ratio (percent v. acid) | 0.105 (12). |
| Hydrocarbon circulation, vol. total hydrocarbon feed/vol. olefin feed | 60,000. |
| Catalyst support | 3 mm. diameter glass beads. |
| Catalyst | 100% w. $H_2SO_4$ |
| Acid recycle rate, vol. acid/vol. acid on beads/hr | 3-6. |

Product distribution, percent w.:

| | | |
|---|---|---|
| $C_5$ | | 9.9 |
| $C_6$ | | 5.1 |
| $C_7$ | | 5.1 |
| $C_8$ 2,2,4-TMP | 24.8 | |
| 2,5-, 2,4-DMH+2,2,3-TMP | 9.6 | 65.6 |
| 2,3,4-, 2,3,3-TMP+2,3-, 3,4-DMH | 31.2 | |
| $C_9$ 2,2,5-TMH | | 6.3 |
| Other | | 1.6 |
| $C_{10}$ | | 2.1 |
| $C_{11}$ | | 1.2 |
| $C_{12}$ | | 2.9 |
| $C_{13}+$ | | 0.2 |
| | | 100.0 |
| Light alkylate ($C_6$-$C_{11}$), percent w. of $C_6$+ alkylate | | 96.5 |
| Calcd. S-4 PN of $C_6$-$C_{11}$ alkylate | | 158 |

We claim as our invention:

1. A process for producing alkylate which comprises passing in separate, substantially continuous phases hydrocarbon comprising an isoparaffin and an olefin in downward and concurrent flow with a concentrated mineral acid alkylation catalyst at a temperature from about 0° C. to 65° C. over a hydrophilic surface of a contact bed of solid inert material, the ratio by volume of acid to hydrocarbon in the contact zone being from about 0.05:1 to about 0.4:1, and recovering alkylate from the contact zone effluent.

2. A process according to claim 1 wherein the concentrated mineral acid is sulfuric acid.

3. A process according to claim 1 wherein the concentrated mineral acid is hydrofluoric acid.

4. A process for producing alkylate which comprises passing in separate, substantially continuous phases hydrocarbon comprising an isoparaffin and an olefin in downward and concurrent flow with a concentrated mineral acid alkylation catalyst at a temperature from about 0° C. to 65° C. over a hydrophilic surface of a contact bed of solid inert material, the ratio by volume of acid to hydrocarbon in the contact zone being from about 0.05:1 to about 0.4:1, withdrawing from the contact bed hydrocarbon and acid as continuous phases, separating the acid phase and the hydrocarbon phase, recycling at least a part of the acid to the contact bed, and recovering alkylate from the hydrocarbon phase.

5. A process according to claim 4 where the amount of acid passed with hydrocarbon to the contact bed is from about 0.01 part to 0.3 part by volume per part by volume of hydrocarbon.

6. A process for producing alkylate which comprises passing in separate, substantially continuous phases hydrocarbon comprising isobutane and an olefin in downward and concurrent flow with a concentrated mineral acid alkylation catalyst at a temperature from about 0° C. to 65° C. over a hydrophilic surface of a contact bed of solid inert material, the ratio by volume of acid to hydrocarbon in the contact zone being from about 0.05:1 to about 0.4:1, withdrawing from the contact bed hydrocarbon and acid as continuous phases, separating the acid phase and the hydrocarbon phase, recycling at least a part of the acid to the contact bed, and recovering alkylate from the hydrocarbon phase.

7. A process for producing alkylate which comprises passing in separate, substantially continuous phases hydrocarbon comprising an isoparaffin and an olefin in downward and concurrent flow with sulfuric acid of alkylation strength at a temperature from about 0° C. to 65° C. over a hydrophilic surface of a contact bed of solid inert material, the ratio by volume of acid to hydrocarbon in the contact zone being from about 0.1 to about 0.25, withdrawing from the contact bed hydrocarbon and acid as continuous phases, separating the acid phase and the hydrocarbon phase, recycling at least part of the acid to the contact bed, and recovering alkylate from the hydrocarbon phase.

8. A process according to claim 7 wherein the isoparaffin is isobutane.

9. A process according to claim 8 wherein the olefin has a carbon number in the range from 3 to 6.

References Cited in the file of this patent

UNITED STATES PATENTS

| 2,346,294 | Danforth | Apr. 11, 1944 |
| 2,660,520 | Bethea | Nov. 24, 1958 |
| 2,913,507 | Binning et al. | Nov. 17, 1959 |